United States Patent [19]

Nemoto

[11] Patent Number: 5,358,310
[45] Date of Patent: Oct. 25, 1994

[54] SEAT BELT DEVICE IN AN AUTOMOTIVE SEAT

[75] Inventor: Akira Nemoto, Akishima, Japan
[73] Assignee: Tachi-S. Co., Ltd., Akishima, Japan
[21] Appl. No.: 946,398
[22] Filed: Sep. 17, 1992
[51] Int. Cl.5 .................................... B60R 22/18
[52] U.S. Cl. ............................ 297/483; 297/473
[58] Field of Search .............. 297/483, 473, 464; 280/801 R, 808

[56] References Cited

U.S. PATENT DOCUMENTS

| | | | |
|---|---|---|---|
| 4,060,260 | 11/1977 | Collins | 280/808 |
| 4,469,352 | 9/1984 | Körner et al. | 297/483 X |
| 4,840,404 | 6/1989 | Falterman | 280/808 |
| 4,846,498 | 7/1989 | Köhl | 297/483 X |
| 4,880,254 | 11/1989 | Müller | 297/483 X |
| 4,884,825 | 12/1989 | Grunewald et al. | 297/483 X |
| 5,102,166 | 4/1992 | Bogner | 297/483 X |

FOREIGN PATENT DOCUMENTS 62-189965 12/1987 Japan.
2-42858 3/1990 Japan.

Primary Examiner—Peter R. Brown
Assistant Examiner—Milton Nelson, Jr.
Attorney, Agent, or Firm—Oldham, Oldham & Wilson, Co.

[57] ABSTRACT

A seat belt device in an automotive seat, which comprises a seat belt extending from a part of the automobile to a floor of the same for restraining a passenger to the seat, and a seat belt guide provided at one upper corner portion of the seat back of the seat.

The seat belt guide includes a guide anchor through which the seat belt slidably passes, and a drive mechanism for causing such through guide anchor to be moved in a vertical direction along the longitudinal direction of the seat back. Thus, the initial point at which the seat belt begins to approach a passenger may be set at a desired level via the guide anchor, thereby adapting the seat belt to better fit, and hence better restrain the passenger's trunk to the seat, irrespective of his or her individual physical differences and/or inclination of the seat back.

6 Claims, 6 Drawing Sheets

SEAT BELT DEVICE IN AN AUTOMOTIVE SEAT

BACKGROUND OF INVENTION

1. Field of the Invention

The present invention relates to a seat belt device used in an automotive seat.

2. Description of Prior Art

In most automobiles or vehicles, a seat belt device is provided for allowing an occupant on the seat to use a seat belt for retaining his or her body in a more safe seating posture against any accident such as a collision or other similar cases.

FIGS. 1(A), 1(B) and 1(C) illustrate a conventional seat device (1) which includes a seat belt (2) and retractor (3) fixed on the lower part of a pillar (P) of an automobile. One end portion of the seat belt (2) extends upwardly from the retractor (3) such that the former may be drawn out of or retracted into the latter. The remainder of the seat belt (2) continuously extends therefrom, passing through the guide plate (4) and then terminating in an end fixed to a floor anchor member (5). The floor anchor member (5) is fixed on a floor (F) of the automobile. The midway point of the seat belt (2) is provided with a securing metallic member (6). The securing metallic member (6) is slidable along the seat belt (2), and engageable into a seat belt anchor (7), so that a passenger (M or m) may fasten the seat belt (2) thereon by engaging the securing member (6) into the anchor (7), or alternatively may release the seat belt (2) from his or her body by disengaging the securing member (6) from the anchor (7). As shown, the two anchor members (5)(7) are disposed on the opposite sides of the seat cushion of seat (S), and they may be fixed on a slide rail device which is normally provided between the seat cushion and the anchor (7).

With this seat belt device, the passenger can have his or her body restrained to the seat (S) by stretching the seat belt (2) across his or her body, and further, can keep the seat belt (2) stretched stably over the body, even if the seat (S) is moved forwardly and backwardly for position adjustment, because the retractor (3) allows free extending and shortening of the seat belt (2) responsive to the forward and backward movement of the seat (S).

However, the above conventional seat belt device is normally designed to restrain an adult passenger (M) to the seat (1) with the length of seat belt shown (2), and consequently, as indicated in FIG. 1(C), if the passenger is a child (m) with a quite smaller physique than that of an adult (M), the seat belt passes the face and neck of the child (m), which leaves a problem in matching the seat belt to such a small person. In addition thereto, as shown in FIG. 1(B), with the seat back (Sb) inclined backwardly, the trunk of passenger (M) a is distance from the upper section (2a) of seat belt (2), while the lower section (2b) of the seat belt (2) remains to restrain the passenger's waist to the seat (S). This results in the seat belt upper section (2a) being inactive and idle, not serving its restraining effect.

SUMMARY OF THE INVENTION

In view of the above-stated drawbacks, it is therefore a purpose of the present invention to provide an improved seat belt device in an automotive seat, which causes the seat belt to restrain a passenger's body to the seat, irrespective of his or her individual physical differences and of the inclination of the seat back.

To achieve such a purpose, according to the present invention, there is provided a seat belt device which comprises a seat belt whose end is introduced from a part of the automobile, the seat belt extending over the seat for restraining a passenger thereon; and a seat belt guide means provided at one upper corner portion of the seat back, said seat belt guide means including; a drive mechanism which is disposed in the seat back at a location corresponding to said one upper corner portion of the seat back, the drive mechanism including a mounting means; a drive means for causing the mounting means to move vertically along a longitudinal direction of the seat back; and a motor for causing operation of the drive means, and a guide anchor which is disposed exteriorly of the seat back and connected to said mounting means of the drive mechanism, through the guide anchor, the seat belt passes in a slidable way.

Accordingly, operation of the drive mechanism causes said guide anchor to be displaced in the vertical direction, so that the introductory point of the seat belt may be positioned at a desired level at the foregoing one upper corner of the seat back, whereby the seat belt may remain to restrain the passenger's trunk to the seat, irrespective of his or her individual physical differences as well as of the inclination of seat back.

In one aspect of the invention, the drive mechanism includes a housing in which the mounting means and drive means is accommodated. Such housing is disposed within the seat back and formed with an elongated opening in the vertical direction, in order that the through guide anchor may be moved outside the seat back and along that elongated opening.

Preferably, the guide anchor is rotatably connected to the mounting means of the drive mechanism.

Preferably, the mounting means is provided with a slider member for facilitating the slidability of the mounting means in the housing.

Also, preferably, the drive means comprises a driving sprocket wheel, an idler sprocket wheel and a chain which is extended between those two sprocket wheels, and a motor, wherein both ends of the chain are jointed to the foregoing mounting means, and wherein the driving sprocket wheel is fixed to a drive shaft which is in turn operatively connected to the motor.

DETAILED DESCRIPTION OF PREFERRED EMBODIMENT OF THE INVENTION

Figure 1:
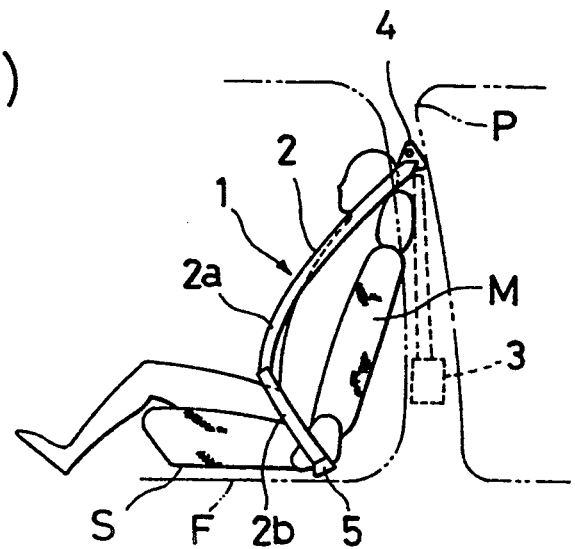
FIGS. 1(A), 1(B), and 1(C) are schematic views showing a conventional seat belt device used for an adult passenger, a showing where the seat back is inclined backwardly, and for a child, respectively.
Figure 1:
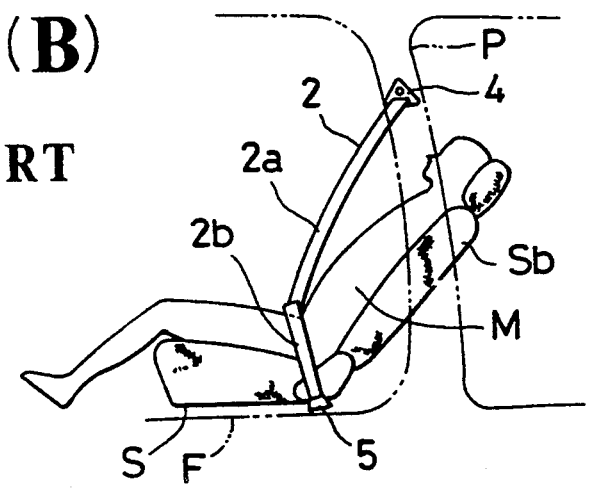
Figure 1:
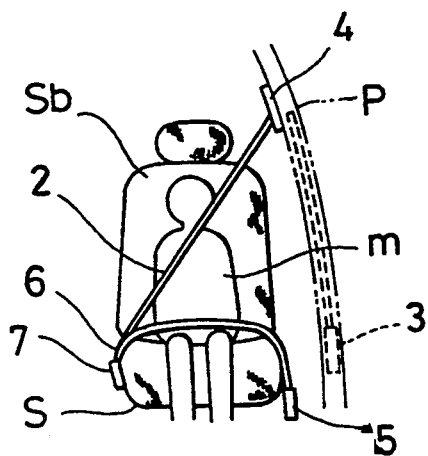

Referring to FIGS. 2 through 6, there is illustrated one embodiment of a seat belt device (10) in accordance with the present invention.

The seat belt device (10) in this embodiment comprises a seat belt guide (11) and the previously described conventional seat belt system including the seat belt (2), guide plate (4), retractor (3), securing or fastening member (6), floor anchor (5) and seat belt anchor (7). The seat belt guide (11) includes a guide anchor (12) and an electric drive mechanism (13).

The guide anchor (12) is comprised of a guide member (12a) and an anchor member (12b). The guide member (12a) is formed with an arcuate guide portion (12a1), thus defining therein an opening through which passes the seat belt (2). Centrally of such guide member (12a), there is provided a securing bolt (12a2) in such a manner as to permit the guide member (12a) to be freely rotatably about the bolt (12a2). Namely, the guide member (12a) is rotatably secured by the headed part of bolt (12a2), while the opposite threaded free end part of the bolt (12a2) is threadedly engaged with the inner threaded bore of an engagement portion (12b1) of an anchor member (12b). The anchor member (12b) is at its base end portion connected with a mounting member (12b2) provided at the electric drive mechanism (13).

The electric drive mechanism (13) is adapted to cause vertical movement of the guide anchor (12) as will become apparent later. Specifically, the mechanism (13) comprises an elongated housing (14) which is elongated in its longitudinal direction, a driving sprocket wheel (15), a second idler sprocket wheel (17), a connecting chain (19) attached over those two sprocket wheels (15) (17), the afore-mentioned mounting member (12b2) associated with the anchor member (12b), and a geared motor (20).

Figure 3:
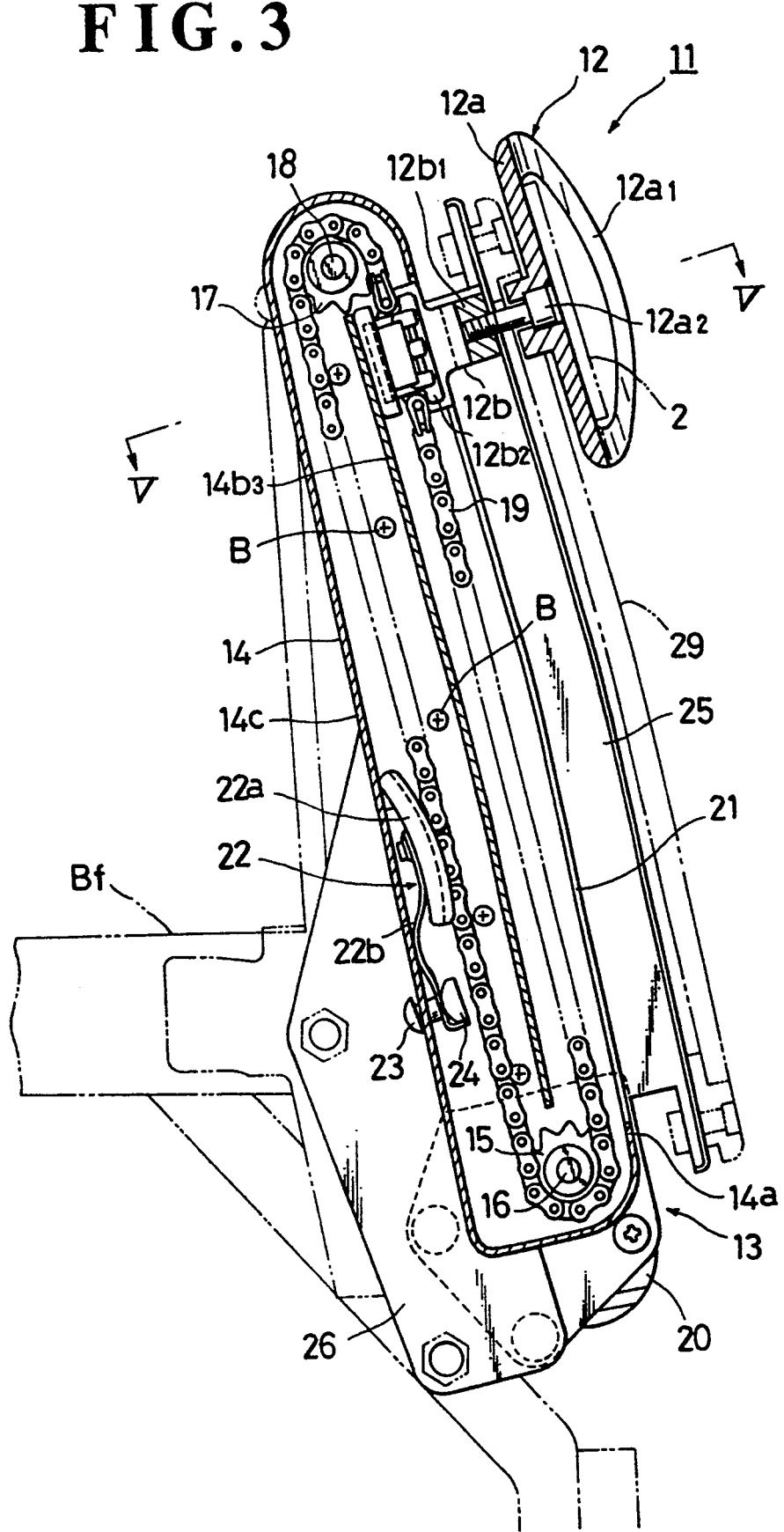
FIG. 3 is a schematic, longitudinal sectional view of a seat belt guide in the seat belt device of the present invention.
Figure 4:
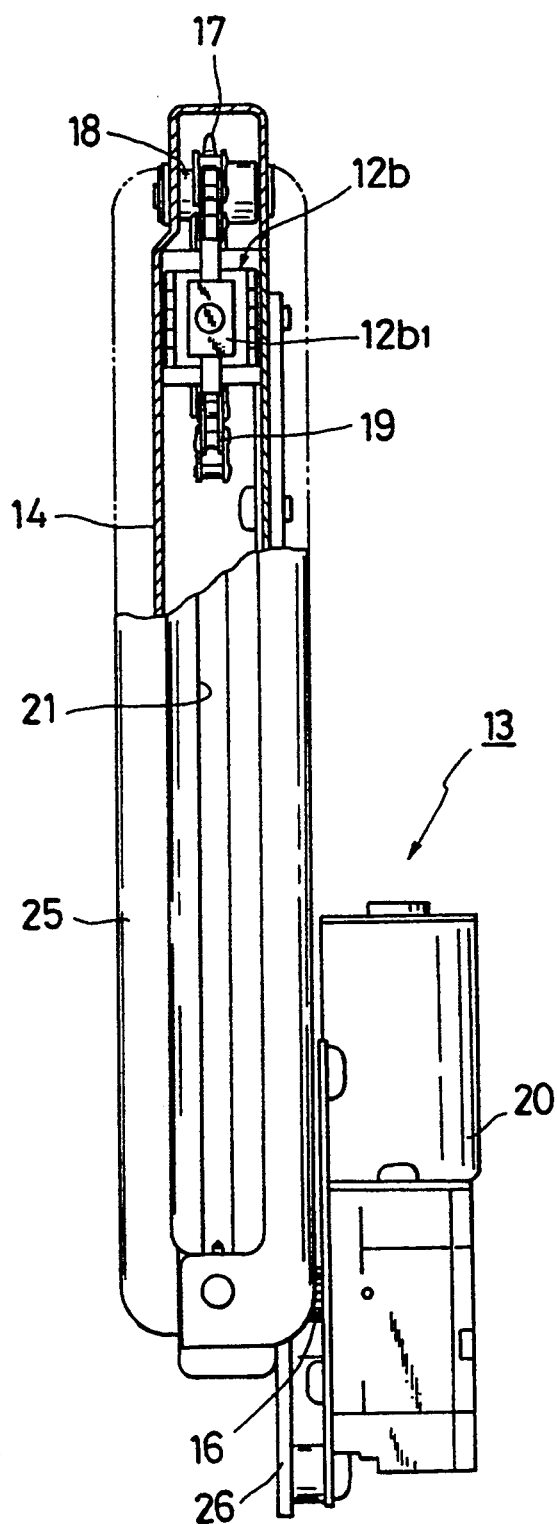
FIG. 4 is a partly broken front view of the seat belt guide as in FIG. 3.
Figure 5:
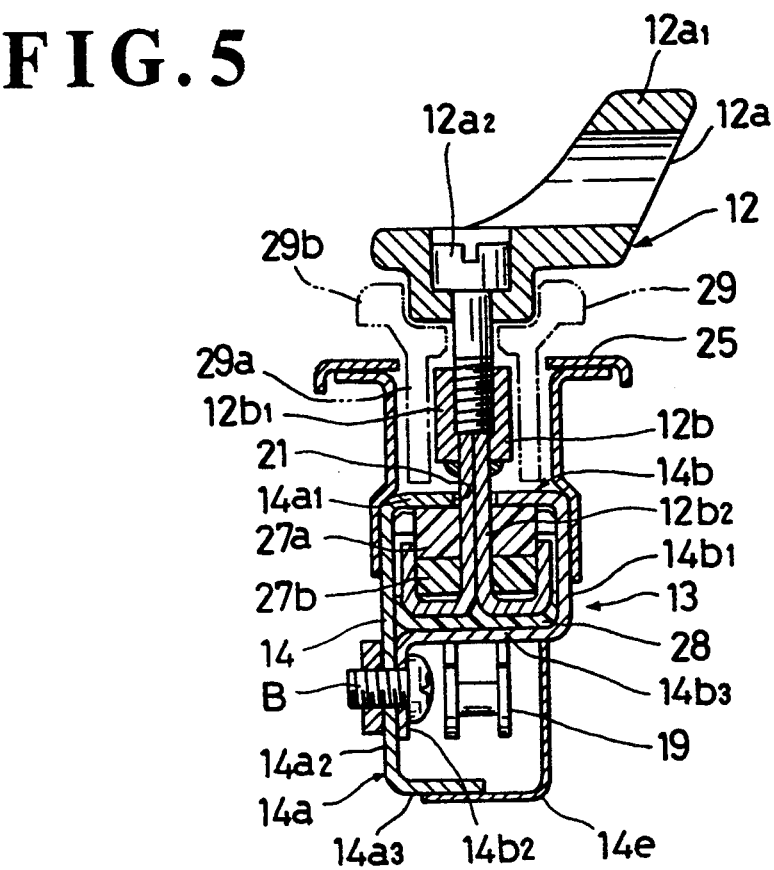
FIG. 5 is an enlarged sectional view taken along the line V—V in FIG. 3.

As best shown in FIG. 5 in conjunction with FIGS. 3 and 4, the housing (14) comprises a first lateral wall (14a), an intermediate wall (14b) and a second lateral wall (14e). The first lateral wall (14a) is generally of a channel shape in section, having an upper horizontal flange part (4a1), a vertical planar part (14a2) and a lower horizontal flange part (14a3). The intermediate wall (14b) is generally of an inverted "S" shape in section, having an upper inverted "L" shaped part (14b1), a horizontal part (14b3), and a lower vertical part (14b2). As viewed from FIG. 5, the upper half of the first lateral wall (14a) is identical to such upper inverted "L" shaped part (14b1) of intermediate wall (14b) in a symmetrical way, and the lower vertical part (14b2) of intermediate wall (14b) is fixedly secured by a bolt (B) to the inner side of vertical planar park (14a2) of first lateral wall (14a), whereupon the intermediate wall (14b) is joined to the opposed first lateral wall (14a), with a hollow zone defined between the upper half of the first lateral wall (14a) and upper inverted "L" shaped part (14b1) of intermediate wall (14b), and further, with an elongated opening (21) being defined between both opposed edges of the upper half of the first lateral wall (14a) and the upper inverted "L" shaped part (14b1).

In that hollow zone, there is slidably accommodated the mounting member (12b2).

As shown in FIG. 5, the mounting member (12b2) has a vertical upper portion whose upper end is fixedly connected to the anchor member (12b), as stated above, and further has a lower portion bifurcated into right-side and left-side upturned projections. The vertical upper portion of that mounting member (12b2) extends upwardly through the foregoing elongated opening (21), thus facilitating connection with the through guide anchor (12).

As illustrated, within such hollow zone of housing (14), the lower portion of mounting member (12b2) is sandwiched by two upper slider members (27a) (27b) and lower slider member (28), The upper surface of the upper slider members (27a)(27b) are in slidable contact with the inner sides of upper end portions respectively of the upper half of first lateral wall (14a) and upper inverted "L" shaped part (14b1) of intermediate wall (14b). The bottom surface of the lower slider member (28) is in a slidable contact with the horizontal part (14b3) of intermediate wall (14b). As such, the mounting member (12b2) is smoothly slidable in the housing (14) along the longitudinal direction thereof, with the upper vertical portion of the same (12b2) being moved along the elongated opening (21).

It is noted that, in assembling the drive mechanism (13), the bifurcated lower portion of mounting member (12b2) is firstly placed in the upper half area of the first lateral wall (14a) of housing (14), then both terminal ends of chain (19) are coupled to the opposite sides of mounting member (12b2) (see FIG. 3), and thereafter the second lateral wall (14b) is fixed to the first lateral wall (14a) by the bolts (B), in order that the bifurcated lower portion of mounting member (12b2) is accommodated in the aforementioned hollow zone between those two lateral walls (14a)(14b).

Within the housing (14), the driving sprocket wheel (15) is disposed at the lower end portion of the housing (14) and fixed on a drive shaft (16), whereas at the opposed upper end portion of housing (14) is disposed the second idler sprocket wheel (17) which is rotatably supported by a shaft (18). The drive shaft (16) is operatively connected with an output shaft of the motor (20), so that the driving sprocket wheel (15) is caused by the motor (20) to rotate about the drive shaft (16), while the idler sprocket wheel (17) is free to rotate about the shaft (18) which is fixed to the housing (14).

As seen in FIG. 3, the chain (19) is extended between the foregoing two sprocket wheels (16)(17), is engaged thereby. Both ends of the chain (19) are jointed to the mounting member (12b2).

Figure 2:
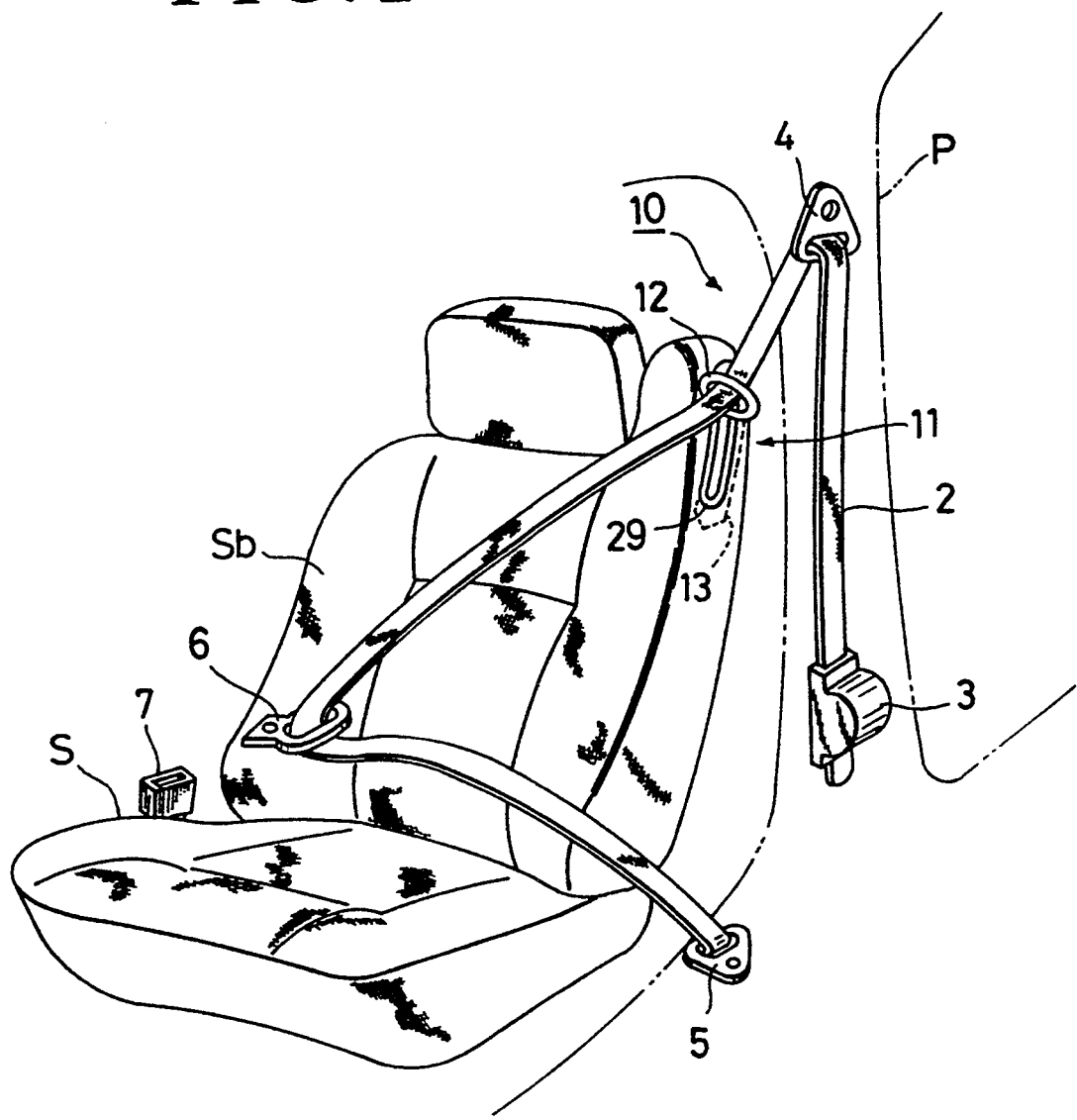
FIG. 2 is a perspective view of a seat to which is applied a seat belt device of the present invention.

As seen in FIG. 2, the elongated opening (21) extends in parallel with a line extending through both centers (16)(18) respectively, of the two sprocket wheels (15), and that the horizontal part (14b3) of intermediate wall (14b) serves to guide the through guide anchor (12).

Also in FIG. 2, it is seen that there is provided a chain tension member (22) between the flange part (14a3) of first lateral wall (14a) and the horizontal part (14b3) of intermediate wall (14b). This chain tension member (22) comprises a pressure plate member (22a), a leaf spring (22b), and a tension adjustment screw (23). As shown, the pressure plate member (22a) is fixed on one end of the leaf spring (22b0) and so arranged as to be in a slidable contact with the chain (19). Another end of the same spring (22b) is connected with the tension adjustment screw (23) which is threadedly engaged with a nut (24). By use of such bolt (23), the pressure of the plate (22a) against the chain (19) may be adjustably varied.

As can be seen from FIGS. 3, 4 and 5, a bracket (25) of an elongated ring shape is mounted upon the plane (14a) of housing (14), such that the bracket (25) projects therefrom in an outward direction, with its periphery surrounding the above-mentioned elongated opening (21). A securing plate (26) is fixed to one lateral wall of the housing (14).

The above-constructed seat belt guide (11) is fixedly mounted in the upper corner area of seat back (Sb). To achieve the proper assembly, first the through guide member (12a) should be disengaged from the seat belt guide (11), without engaging the bolt (12a2) with the engagement portion (12b1), Second, the seat belt guide (11), without the guide member (12a), is fixed to the corresponding upper corner part of seat back frame (Bf) via the securing plate (26) as in FIG. 3. Then, although not clearly shown, the upholstery of seat back (Sb), which normally comprises a foam cushion member and a top cover member fixed thereon, is affixed over the seat back frame (Bf), to thereby form the seat back (Sb). At this point, the previously formed incision (not shown) in the seat back upholstery, which is of a length generally equal to that of the opening (21), is is located so as to overlap that opening (21). Then, a mouth cover member (29) (see FIG. 5) of an elongated ring shape, which comprises a lower securing portion (29a) and an upper flange portion (29b), is inserted into the incision in the seat back (Sb), such that the lower securing portion (29a) is fitted in the afore-stated bracket (25) and the upper flange portion (29b) pressed against the top cover member of seat back (Sb), as can be seen from FIGS. 5 and 3. In this way, a clear-cut opening is defined in the seat back upholstery at the region corresponding to the elongated opening (21) of seat belt guide (11) disposed inside the seat back upholstery, hence providing an easy access to the engagement member (12b1) through the thus-formed opening in the seat back upholstery. Then, the guide member (12a) with the bolt (12a3), which has been separated from the seat belt guide (11) as stated earlier, is brought toward the elongated opening of the mouth cover member (29), and then, the bolt (12a3) is threadedly engaged into the engagement member (12b1) through mouth cover member (29) and bracket (25), so as to firmly connect the guide member (12a) with the seat belt guide (11) inside the seat back (Sb). Therefore, in FIG. 2, the guide anchor (12) is depicted as only projected from the upper lateral area of seat back (Sb).

With the above-described seat belt device (10), the seat belt (2) is inserted the through guide member (12a), as shown in FIG. 2. Accordingly, it is to be appreciated that the initial point at which the seat belt (2) normally is drawn or pulled initially, is located at the upper corner portion of seat back (Sb), instead of the guide plate (4) fixed on the pillar (P).

The motor (20) may be manually controlled by a switch means provided on the seat IS) or other place, and may also be controlled automatically, using an electronic control system with microcomputer, in response to the forward and backward inclination of seat back (Sb).

With the motor (20) in operation, the guide anchor (12) is caused to be moved upwardly and downwardly along the elongated openings respectively of the mouth cover member (29), bracket (25) and housing (14), whereby the initial point of seat belt (2) may be displaced in the vertical direction.

Accordingly, as shown in FIGS. 6(A), 6(B) and 6(c), the seat belt is fit around the trunk of a passenger, no matter the size and irrespective of the forward and backward inclination of the seat back (Sb). Namely, referring now to FIG. 6(A), in the case of the adult passenger (M) sitting on the seat (S), he or she may have the guide anchor (12) displaced at a desired point in the vertical direction in order to set a proper seat belt initial point causing the seat belt (2) (or strictly stated, the upper section (2a) of seat belt (2)) to extend slant on the trunk of the passenger (M) in an optimum state. If, on the other hand, the passenger is a child (m) as in FIG. 6(B), he or she may likewise adjust the seat belt initial point to fasten the upper section of seat belt (2) around his or her small trunk, as shown. Furthermore, referring to FIG. 6(B), due to the provision of the guide anchor (12), the seat belt (2) or the upper section thereof is still fastened upon the passenger's trunk, irrespective of the seat back (Sb) being inclined backwardly.

It is noted that, since the seat belt (2) is secured to the part of the automobile via the retractor (3) and floor anchor (5), the seat (S) is substantially free from a load imparted from the seat belt (2), and it not necessary to increase the rigidity of seat (S).

Figure 7:
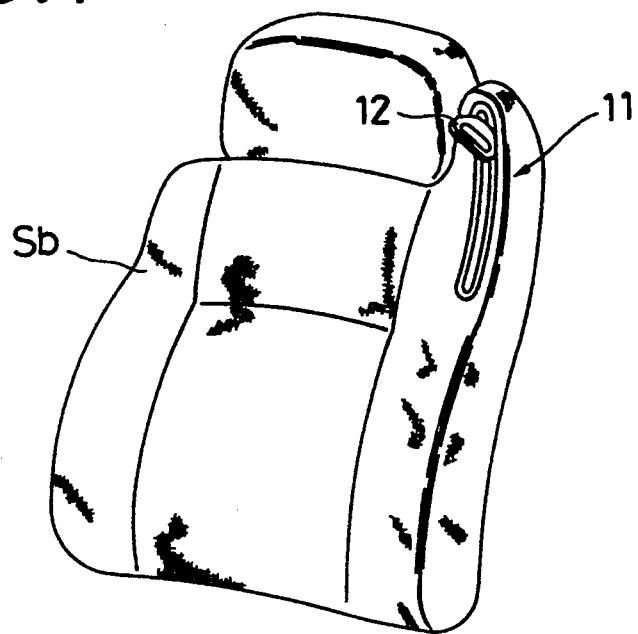
FIG. 7 is a perspective view of another embodiment of seat back.
Figure 6:
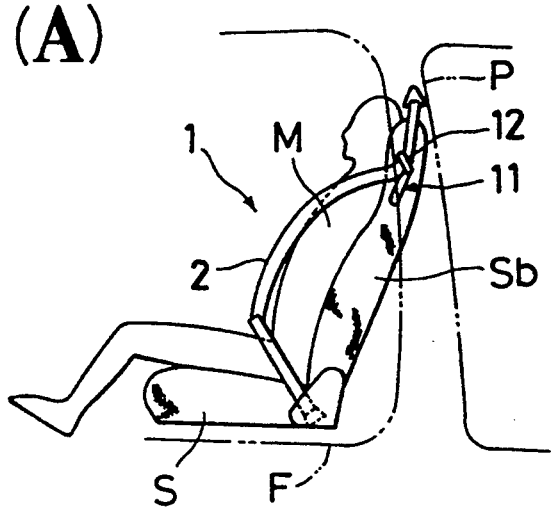
FIGS. 6(A), 6(B) and 6(C) are schematic views showing the seat belt device according to the present invention used for an adult passenger, the situation where the seat back is inclined backwardly, and for the child, respectively.
Figure 6:
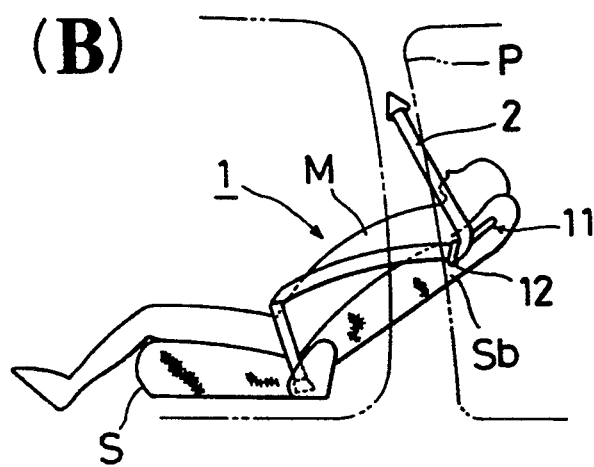
Figure 6:
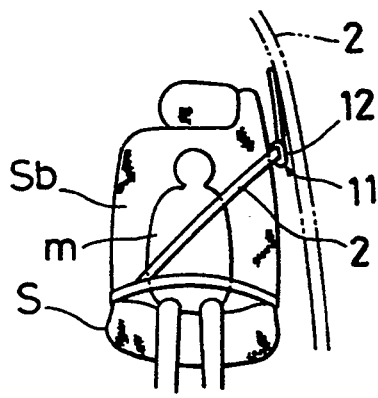

While having described the present invention so far, it should be understood that the invention is not limited to the illustrated embodiment, but any other modifications, additions and replacements may be applied thereto structurally without departing from the spirit and scope of the appended claims. For instance, the combination of sprocket wheels (15)(17) and chain (19) may be replaced by that of pulleys and flexible belt, or by that of a threaded lead screw and a movable block nut. Further, as suggested in FIG. 7, the position of the through guide anchor (12) may be set on the frontal side of seat back (Sb) at the same upper corner area thereof, instead of the embodiment as typically shown in FIG. 2, considering a design or improved appearance of seat (S).

With the above-described arrangements, it is to be appreciated that, according to the present invention, the seat belt (2) remains fastened on the passenger's trunk, irrespective of his or her physical differences, fore-and-aft position of the seat (S), and inclination of seat back (Sb), and therefore, the fitting of the seat belt to the passenger is greatly improved, thus insuring a reliable restraining effect of the seat belt to the passenger and presenting a better safety arrangement in the seat belt.

What is claimed is:

1. A seat belt device in an automotive seat for an automobile, in which the seat includes a seat cushion and a seat back having an upper corner portion and means to provide the seat back to be inclinable relative to said seat cushion, said seat belt device comprising:

a seat belt having two ends, one end thereof for anchoring to the automobile, said seat belt extending over said seat for restraining a passenger thereon; and a seat belt guide means provided at said upper corner portion of said seat back, said seat belt guide means including:

a drive mechanism which is disposed in said seat back at a location corresponding to said upper corner portion of said seat back, said drive mechanism including:

(a) a mounting means;

(b) a drive means for causing said mounting means to be moved in a vertical direction along a longitudinal direct on of said seat back; and (c) a motor for causing operation of said drive means, and a guide anchor which extends from said seat back and connected to said mounting means of said drive mechanism, such that said anchor is located at the same location with that of said drive mechanism at said upper corner portion of said seat back, wherein said seat belt slidably passes through said guide anchor;

wherein operation of said mechanism causes said guide anchor to be displaced in said vertical direction, so that said seat belt may be anchored at a desired initial point in said upper corner of said seat back and thus the initial point of said seat belt with respect to the seat back front said anchor to the automobile may be varied to accommodate the fit of the seat belt to passengers of different sizes when the seat is reclined.

2. The seat belt device according to claim 1, wherein said guide anchor includes a guide member through which said seat belt slidably passes and wherein said guiding member is rotatably connected to said mounting means.

3. The seat belt device according to claim 1, wherein said drive means includes a housing accommodating therein said mounting means and said drive means, and wherein said housing is formed in a shape extending along said vertical direction in which both said mounting means and guide anchor are caused to be moved by said drive means and wherein said housing is disposed within said seat back.

4. The seat belt device according to claim 3, wherein said housing is formed with an elongated opening in said vertical direction in which said mounting means is moved, so that said guide anchor is caused to be moved by said drive means along said elongated opening.

5. The seat belt device according to claim 3, wherein said drive means comprises a driving sprocket wheel, an idler sprocket wheel, and a chain which is extended between and engaging said two sprockets, wherein said driving sprocket wheel is operatively connected to an output shaft of said motor, while said idler sprocket wheel is rotatably supported to said housing, and wherein both ends of said chain are joined to said mounting means.

6. The seat belt device according to claim 3, wherein said guide anchor has a lower portion disposed within said housing for connection with said mounting means, and wherein said mounting means is provided with a slider member for facilitating a slidability of said mounting means within said housing.

* * * * *